J. C. SCOGGINS.
VEHICLE POLE.
APPLICATION FILED JAN. 14, 1915.
1,161,535.
Patented Nov. 23, 1915.
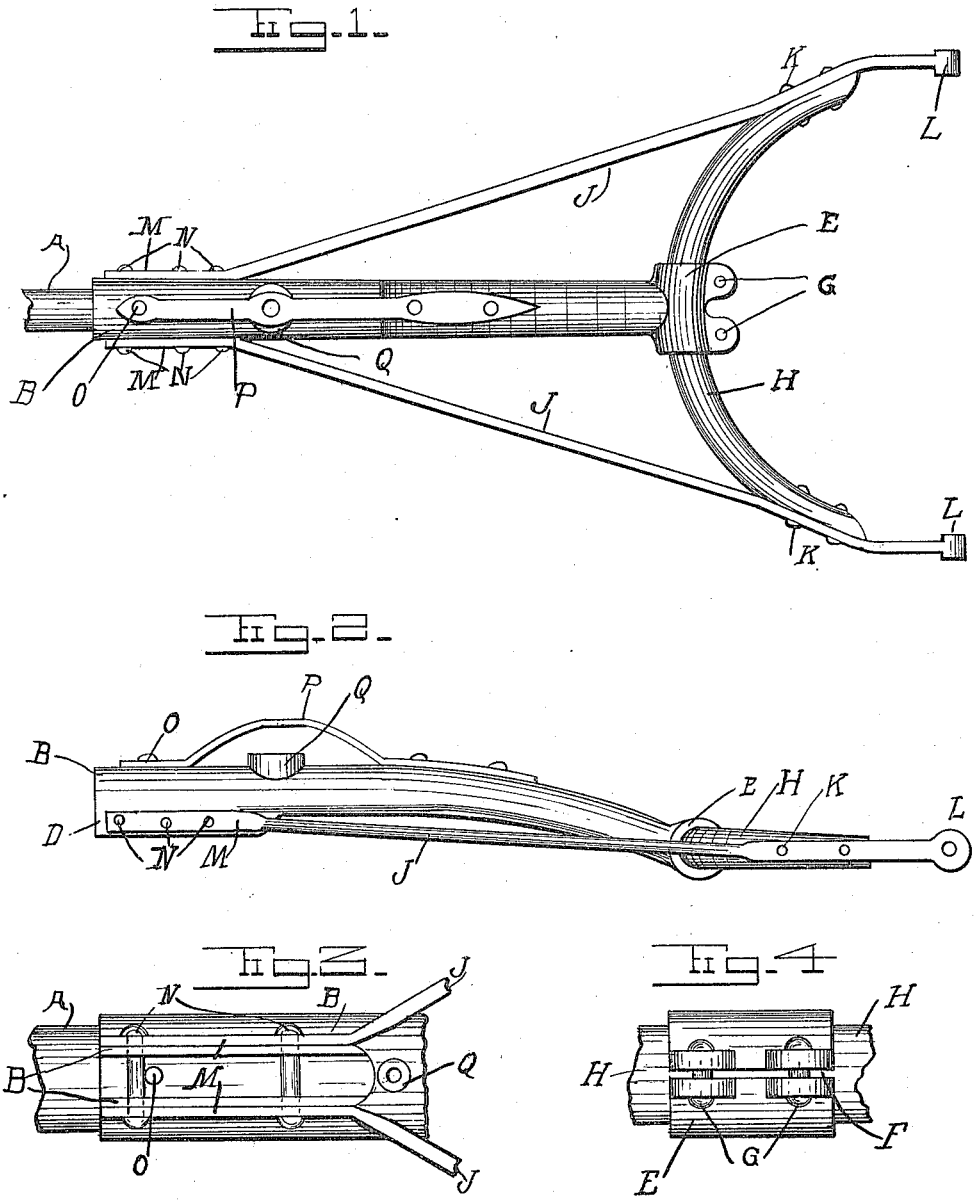

UNITED STATES PATENT OFFICE.

JESSE C. SCOGGINS, OF VIOLA, KANSAS.

VEHICLE-POLE.

1,161,535.  Specification of Letters Patent.  Patented Nov. 23, 1915.

Application filed January 14, 1915. Serial No. 2,146.

*To all whom it may concern:*

Be it known that I, JESSE C. SCOGGINS, a citizen of the United States, residing at Viola, in the county of Sedgwick and State of Kansas, have invented certain new and useful Improvements in Vehicle-Poles, of which the following is a specification.

My invention relates to improvements in vehicle poles, the object being the provision of a vehicle pole constructed mainly of metal and possessing the necessary strength and durability but comparatively light in weight.

Another object of my invention is the provision of a vehicle pole which can be produced at a low price and which will be thoroughly efficient and practical in every particular.

To attain the desired objects my invention consists of a vehicle pole embodying novel features of construction and combination of parts, substantially as shown, described and claimed herein:

Figure 1 is a top plan view of a vehicle pole constructed in accordance with and embodying my invention. Fig. 2 is a side view thereof, Fig. 3 is a detail view of the connection or clamp between the pole, sleeve and draft bars, and Fig. 4 is a detail view of the novel form of clamp connecting the sleeve with the yoke.

Referring by letter to the drawings: the letter A, designates the pole which is hollow and preferably constructed of steel with its inner end fitting in the sleeve or boot B, which is formed with the split or opening C, its underface having the pair of flanges D. The sleeve or boot B, is curved and at its inner end is formed with the transverse collar E, having the split or open portion F, which receives fastenings G, to cause said collar to bind or clamp upon the yoke H. From this construction it will be noted that the boot is of novel and peculiar construction being formed at its outer end with an opening or split portion to clamp upon the pole and with a pair of vertical flanges and at its inner end having a clamping collar to bind upon the yoke which features constitute important points in my invention.

The yoke and boot are connected and secured in rigid relation by the inclined brace rods J secured at K, to the yoke and formed with the draft arms L, and at their outer ends formed with flat plates M, resting flat against the flanges D, of the boot and secured thereto by means of the transverse bolts or fastenings N, which as a whole forms a clamp to engage and retain the pole carrying a stud O, which acts as a stop and prevents the pole from being pulled out of the boot.

The boot is provided upon its upper face with the whiffletree guard P, and with the thimble Q, to receive the pin of the whiffletree for connecting it to the sleeve.

The vehicle pole is light in weight but very durable and is particularly desirable as a buggy or light vehicle pole but may be used in any situation where it would fulfil its functions.

The pole can be easily clamped and secured in the boot and the yoke readily applied and all parts are assembled in a compact manner and produce a vehicle pole which is ornamental; light in weight; simple and inexpensive and entirely practical in every particular.

The important feature of this pole resides in the construction of the boot with the pair of depending flat elongated flanges and the brace rods having at one end the flat elongated plates secured to said flanges, as this construction insures a much improved device over my former patent.

I claim:

The vehicle pole herein described, consisting of a pole, a boot receiving the inner end of the pole and formed with a split portion having a pair of elongated depending flanges, a split clamping collar formed on the inner end of the boot, a yoke secured in said clamping collar and brace rods secured near their rear ends to said yoke and terminating in draft arms and having their forward ends formed with elongated vertical portions or plates bearing against and secured to the flanges of the boot to clamp the pole in the boot.

In testimony whereof I affix my signature in presence of two witnesses.

JESSE C. SCOGGINS.

Witnesses:
 ORA HART,
 C. E. GRIMSLEY.

Copies of this patent may be obtained for five cents each, by addressing the "Commissioner of Patents, Washington, D. C."